(12) United States Patent
Amin

(10) Patent No.: US 7,832,557 B2
(45) Date of Patent: Nov. 16, 2010

(54) GOLF BAG

(76) Inventor: Jatin Amin, 226 Santure Rd., Monroe, MI (US) 48162

( * ) Notice: Subject to any disclaimer, the term of this patent is extended or adjusted under 35 U.S.C. 154(b) by 62 days.

(21) Appl. No.: 12/045,266

(22) Filed: Mar. 10, 2008

(65) Prior Publication Data

US 2008/0217193 A1   Sep. 11, 2008

Related U.S. Application Data

(60) Provisional application No. 60/906,242, filed on Mar. 9, 2007.

(51) Int. Cl.
*A63B 55/00* (2006.01)
*A63B 55/06* (2006.01)
*A63B 55/08* (2006.01)

(52) U.S. Cl. ............. 206/315.5; 206/315.6; 206/315.7; 248/96; 280/87.041; 280/DIG. 6

(58) Field of Classification Search ... 206/315.5–315.7, 206/315.3, 315.8; 248/96; 280/DIG. 5, DIG. 6, 280/87.041; 220/503, 504
See application file for complete search history.

(56) References Cited

U.S. PATENT DOCUMENTS

| | | | | |
|---|---|---|---|---|
| 1,555,772 | A * | 9/1925 | Stripe | 280/47.26 |
| 2,937,706 | A * | 5/1960 | Chandler | 180/19.3 |
| 3,172,681 | A | 3/1965 | Moses | |
| 3,373,911 | A | 3/1968 | Kebelbeck | |
| 4,012,051 | A * | 3/1977 | Embinder | 280/47.19 |
| 4,142,563 | A | 3/1979 | Ackerfeldt et al. | |
| 4,383,563 | A | 5/1983 | Kirchhoff, Jr. | |
| 5,156,366 | A * | 10/1992 | Anderson | 248/96 |
| 5,671,842 | A * | 9/1997 | Jaworski | 206/315.3 |
| 5,678,791 | A * | 10/1997 | Maeng | 248/96 |
| 6,494,352 | B1 * | 12/2002 | Mullen | 224/524 |
| 6,615,982 | B1 * | 9/2003 | Stewart et al. | 206/315.3 |
| 6,652,045 | B1 * | 11/2003 | Jungkind | 206/315.7 |
| 6,659,477 | B2 * | 12/2003 | Jung | 280/47.26 |
| 7,004,482 | B1 * | 2/2006 | Steffan | 280/47.17 |
| 2002/0066763 | A1 * | 6/2002 | Hsueh | 224/901.2 |
| 2003/0106817 | A1 * | 6/2003 | Buckley | 206/315.6 |
| 2005/0072695 | A1 * | 4/2005 | Shaanan | 206/315.3 |
| 2006/0151966 | A1 * | 7/2006 | Murphy et al. | 280/47.26 |

* cited by examiner

*Primary Examiner*—Sue A Weaver
(74) *Attorney, Agent, or Firm*—Harness, Dickey & Pierce, PLC

(57) ABSTRACT

A golf bag for carrying a plurality of golf clubs in an organized fashion, comprising an elongated rigid or soft-sided container having a plurality of compartmentalized golf club receiving holes positioned partially around the perimeter of the top for holding the various golf clubs. A storage area comprised of a series of drawers or storage compartments are arranged vertically along one side of the golf bag wherein the golf club receiving compartments are positioned partially around the perimeter of the storage area. A pair of extendable stand-to legs and optional extensible handle and dolly may be further integrated into the design. A cart (either powered or manually pulled) may be securely attached to the bottom of the golf bag, wherein the drive means and battery are received within a central raised portion of the cart, complementary to a recess on the bottom of the golf bag.

9 Claims, 8 Drawing Sheets

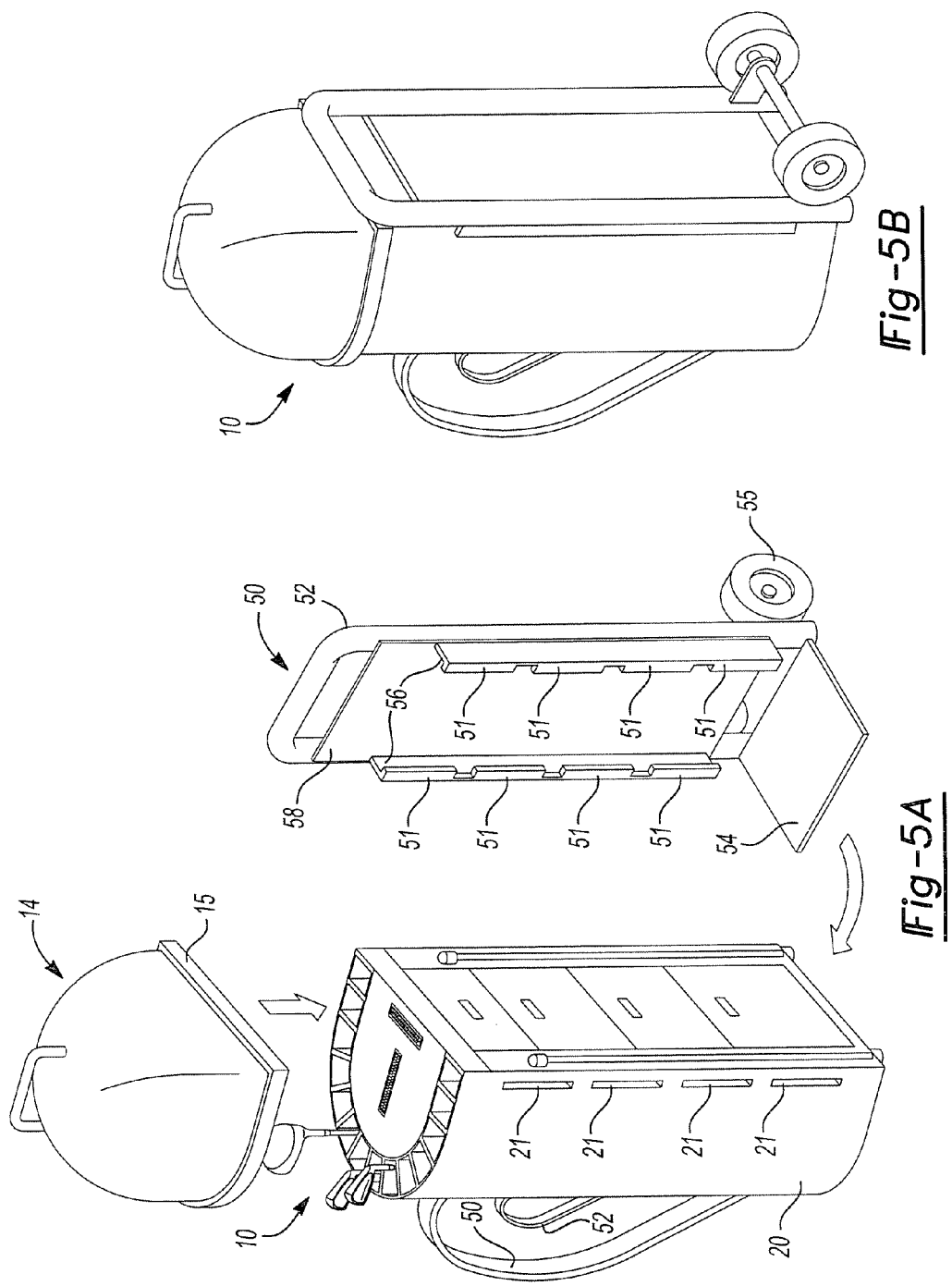

GOLF BAG

CROSS-REFERENCE TO RELATED APPLICATIONS

This application claims the benefit of U.S. Provisional Application No. 60/906,242, filed on Mar. 9, 2007. The disclosure of the above application is incorporated herein by reference.

FIELD

The present disclosure relates to bags for storing and carrying golf-related items such as clubs and accessories. More particularly, this invention relates to golf bags of rigid construction having an associated means of motility.

BACKGROUND

The statements in this section merely provide background information related to the present disclosure and may not constitute prior art.

Containers utilized for carrying golf clubs are abundant in the art, varying in size, construction, mobility, storage, and ease of use. Many golf bags suffer from the same disadvantages of excessive size and weight, as well as having a lack of sufficient storage for accessories, such as tees, balls, pencils, old scorecards, gloves, insect repellant, ball markers, etc., which are randomly strewn throughout the storage pockets or pouches of the golf bag. If the storage areas are large enough (usually governed by the size of the bag), one often finds an old jacket or two, towels, and hats. When the golfer wishes to locate a specific item or article, several different storage areas are routinely searched. This problem is compounded by the location of these storage areas and their circumferential positioning around the exterior of the bag. If the bag is mounted onto a wheeled cart, certain storage areas may simply not be accessible without removal of the bag from the cart. Since the storage areas are usually soft pouches, the interior space may be compressed or contorted such that it is difficult to retrieve the contents. Another disadvantage commonly associated with conventional golf bags is that the interior space of the golf bag is excessive with respect to the space needs for the clubs which are carried therein, and this represents another design inefficiency.

The first category of golf club carriers, while not altogether suffering from all of the same above-identified disadvantages, is of a somewhat different style and should not be considered a golf bag in the general sense. These "low-boy" carriers do not provide any protection to the clubs from the elements; storage space is limited; durability is questionable; and transporting is awkward. These types of shortcomings have been recognized generally by golfers, thereby accounting for the limited popularity of this first category or type of carrier. Further, there is no attempt with carriers of either category to arrange the storage areas in a particular manner, nor to reduce size and weight while retaining the desirable features of conventional golf bags.

One prior art design, U.S. Pat. No. 3,172,681 issued to Moses, discloses a golf club carrier in combination with a wheeled golf cart which includes a plurality of club-receiving tubes extending between a top plate and a bottom plate. The top plate is further configured with areas for storage of golf balls, tees, and scorecards, and interior to the plurality of tubes is an accessory bag. Although this construction eliminates some of the excessive weight and size associated with conventional golf bags, nothing is done to simplify and make more efficient the storage of accessory golf items. Furthermore, this type of golf bag provides no means of closing up the bag to protect the clubs and other contents from damage.

U.S. Pat. No. 3,373,911, issued to Kebelbeck, discloses a receptacle which is adapted for attachment to a golf bag cart for the storage therein of street shoes or golf shoes as well as a removable waterproof cover for the golf bag itself. Although this particular disclosure pertains to a storage compartment for golf equipment, it does not represent a modification or change in design of golf club carriers and is believed to be of only limited applicability to the present invention. Furthermore, the overall size of the bag is increased with the attached receptacle, making storage and transportation of the bag more difficult.

Ackerfeldt et al., U.S. Pat. No. 4,142,563, discloses a golf bag for storage and transport of golf clubs and includes a relatively long and narrow container, preferably of a plastic material, for receipt of the golf clubs such that with the shafts inserted, only the heads of the clubs protrude from the container at its upper open end. Separate storage bags are provided and are detachably mounted to the exterior surface of the container by means of two parallel, external key grooves in the peripheral wall of the container.

U.S. Pat. No. 4,383,563, issued to Kirchhoff, Jr., discloses a rigid-sided golf bag having a plurality of independent golf club holding tubes partially encircling several storage compartments. Unfortunately, the bag of this construction provides for no means of securely resting the bag in a vertical orientation without fear of the bag toppling over while not attended.

While these and other designs for golf bags have implemented means for storing additional equipment besides golf clubs, none has taken into consideration implementing a truly organized means of storing such accessories and providing a way of protecting the clubs and accessories from the elements or from damage due to the bag falling over. Furthermore, none of the above prior art provides a golf bag having a detachable means of motorized motility which greatly enhances the golfing experience by reducing the fatigue of the golfer. Though each of the above patent references relate generally to conventional golf bags and modifications thereof, none of the disclosures anticipates the invention described herein.

SUMMARY

It is a primary object of the present invention to provide a golf bag of either rigid or soft-sided construction with ample, organized storage for accessories such as shoes, towels, and golf balls in addition to golf clubs.

It is another object of the present invention to provide a golf bag having an integrated means of attaching the bag to a cart.

A further object of the present invention is to provide a golf bag having a plurality of individual golf club holding apertures.

A further object of the present invention is to provide a golf bag having an optional motorized cart which is form-fitted to the bottom of the golf bag.

A further object of the present invention is to provide a golf bag having an optional extensible handle for pulling the bag when attached to a dolly or cart.

Another object of the present invention is to provide a golf bag which comprises stand-to legs for maintaining the golf bag upright while unattended.

These and other objectives will become apparent from the detailed description herein providing a golf bag for carrying a plurality of golf clubs in an organized fashion, comprising an elongated, rigid-sided or soft-sided container having a rigid support structure embodying a plurality of compartmentalized golf club receiving holes positioned partially around the perimeter of the top for holding the various golf clubs. A series of drawers or storage compartments are arranged vertically along one side of the golf bag, wherein the storage area comprises the center of the golf bag around which the clubs are oriented. A pair of extendable stand-to legs are provided vertically along the side of the bag and have an actuating mechanism integrated into the bottom of the golf bag. An optional extensible handle and dolly are further integrated into the design, wherein the dolly provides a cover means, protecting the storage drawers or compartments when attached to the golf bag during transportation.

Optionally, a wheeled-cart may be attachable to the bottom of the golf bag, wherein the cart comprises a central raised portion which may contain an optional drive means and battery to power the cart. The raised portion is complementary to a recess in the bottom of the golf bag within which it is securely received when the cart is attached to the bag.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 5A is a perspective view of the primary embodiment of the present invention shown with an attachable dolly and club cover prior to attachment;

FIG. 5B is a perspective view of the embodiment of FIG. 5A in association with the dolly and club cover attached;

DETAILED DESCRIPTION

Figure 1:
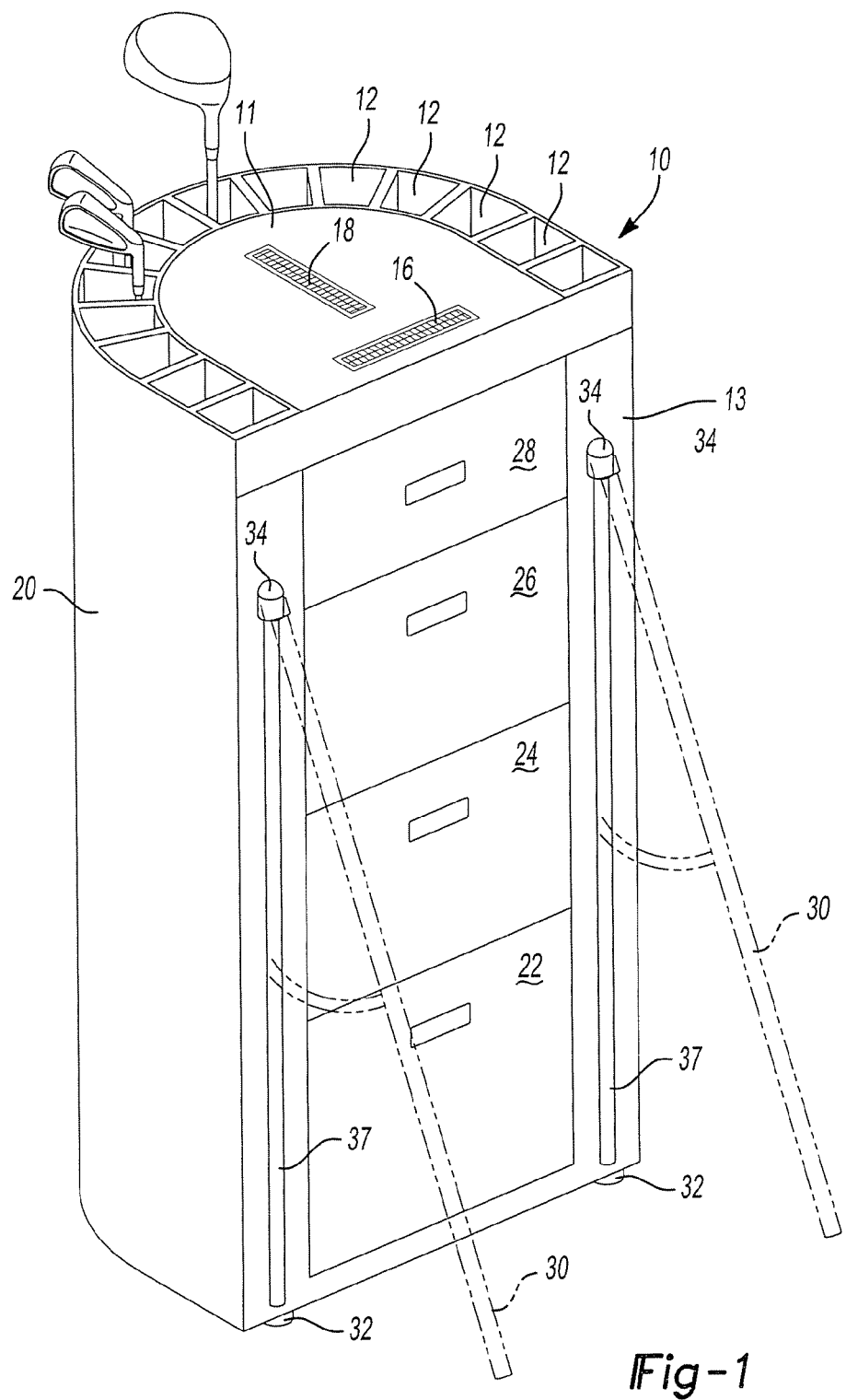
FIG. 1 is a perspective view of a first embodiment of the golf bag of the present invention.

The following description is merely exemplary in nature and is not intended to limit the present disclosure, application, or uses. It should be understood that throughout the drawings, corresponding reference numerals indicate like or corresponding parts and features.

Referring now to the figures, in particular FIG. 1, the preferred embodiment of a golf bag 10 is shown comprising a semi-circular container 20, manufactured from either a durable fabric or a rigid material comprising any number of polycarbonate or suitable plastic materials. The golf bag 10 features a plurality of longitudinal compartments 12, opening to the top side 11, positioned around the perimeter of the semi-circular portion of container 20. These compartments are designed to each hold one or more golf clubs used during game play. A planar front side 13 of the bag comprises a plurality of vertically aligned, storage compartments 22, 24, 26, and 28 which are generally flush with the planar side 13 when in their closed orientation. These storage compartments are utilized for storing golf-related articles, such as balls, gloves, shoes, towels, tees, and any number of other items, in an organized, easy to access manner. Additionally, located on the top surface 11 are zippered compartments 16 and 18 which may be utilized for holding smaller items such as a rain-fly for the golf bag or golf tees.

Positioned on the frontal planar side 13 on either side of the vertical storage compartments 22, 24, 26, and 28 are a pair of stand-to legs 30 utilized for resting the golf bag in a generally upright orientation while unattended. These legs 30 are attached at the top to pivot points 34 and are actuated to swing out from the golf bag, as shown, when the weight of the golf bag 10 and its contents trigger the compression of actuators 32 when in contact with the ground. The legs 30 are further spring-assisted so as when the golf bag 10 is lifted up off the ground, they return to the parallel, closed orientation in grooves 37 adjacent the golf bag side 13.

Figure 2A:
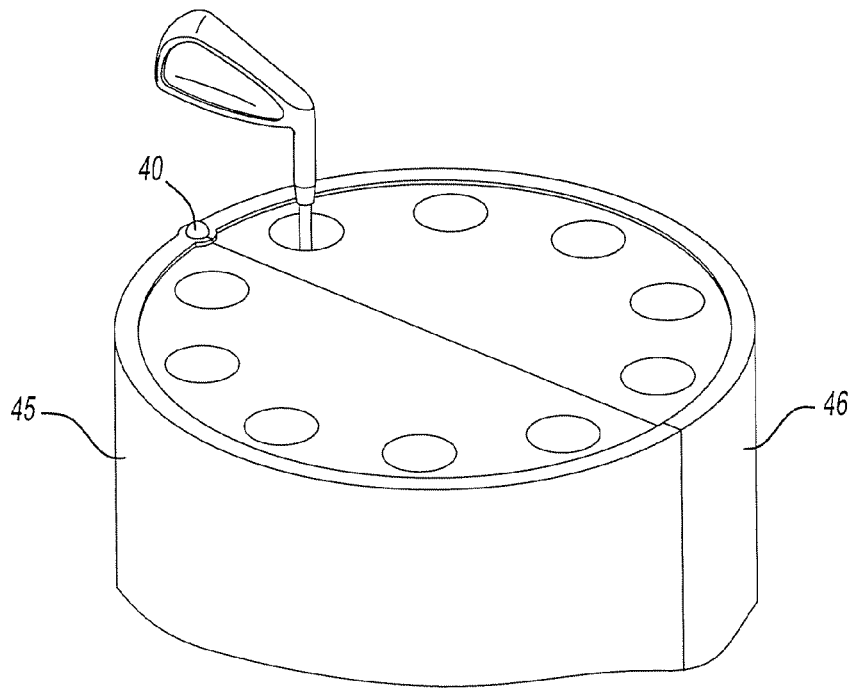
FIG. 2A is partial perspective view of a prior art golf bag in the closed orientation.
Figure 2B:
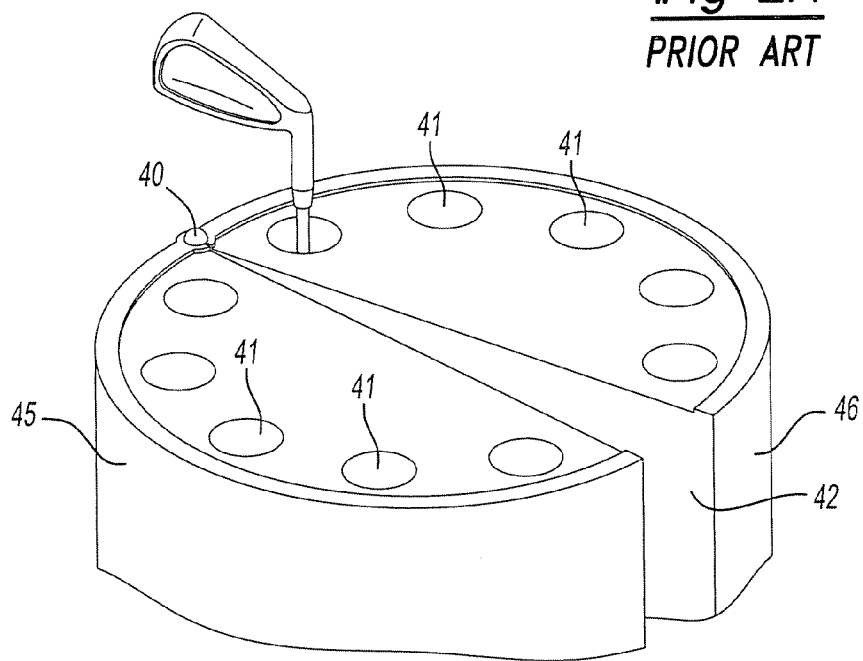
FIG. 2B is partial perspective view of the prior art golf bag in FIG. 2A in the opened orientation.

As mentioned above, several prior art designs have tried to devise various means of storing golfing accessories. One such means is to store them within a compartment inside a folding golf bag having a plurality of golf club holding tubes 41 as shown in prior art FIGS. 2A and 2B. Depicted here, the golf bag comprises two complementary halves 45, 46 which are pivotally separable along pivot axis 40. When opened, a storage compartment on the interior 42 allows for storage of golf accessories, but does not allow access to them without opening the entire bag. This would be difficult if the bag were strapped to a cart.

Figure 3:
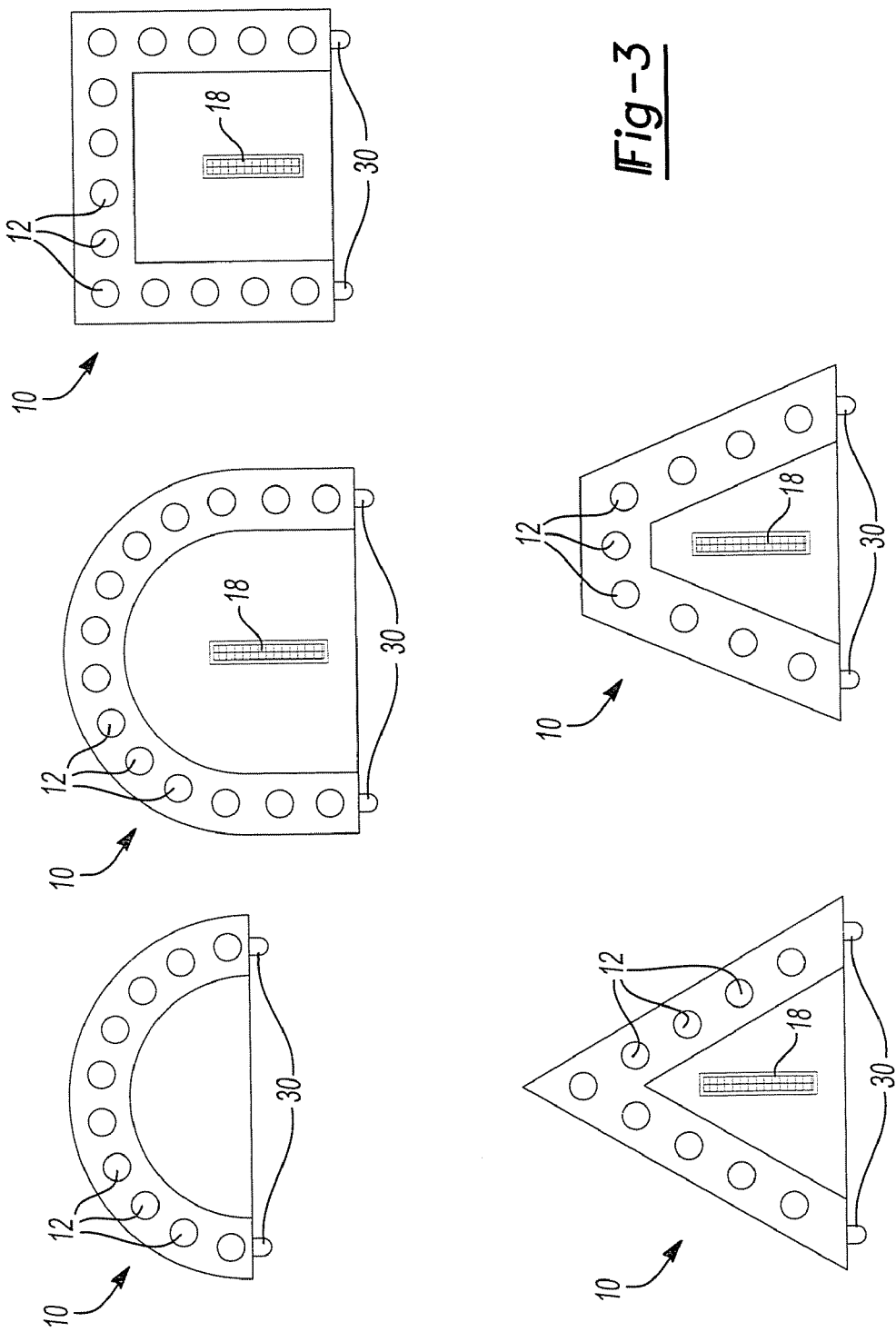
FIG. 3 is a plurality of top views of various shapes which the present invention may embody.

Referring now to FIG. 3, a plurality of alternative embodiments for the present invention 10 is depicted. Variations in shapes to accommodate users' preferences are intended to be within the scope of the present invention, including triangular, polygonal, crescent, and rectangular. The key features of the golf bag 10 of FIG. 1 are retained, wherein these alternative embodiments comprise stand-to legs 30, a plurality of club holding passages 12, and optional upper zipper compartment(s) 18. The frontal storage compartments are also retained for storage of larger items.

Figure 4:
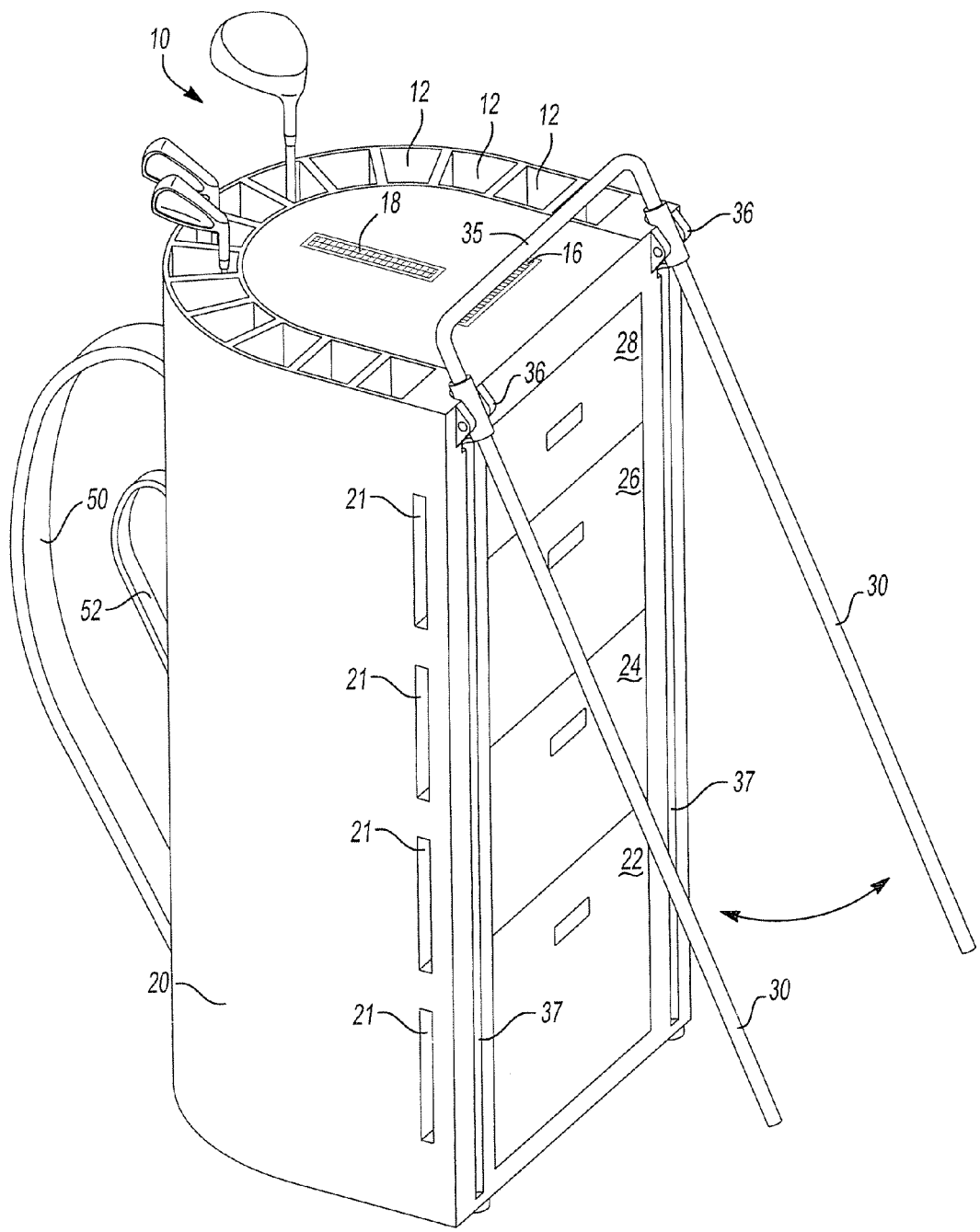
FIG. 4 is a is a perspective view of a further embodiment of the golf bag of the present invention, having a handle integrated into the pivotal stand legs, shown in the open orientation.
Figure 4A:
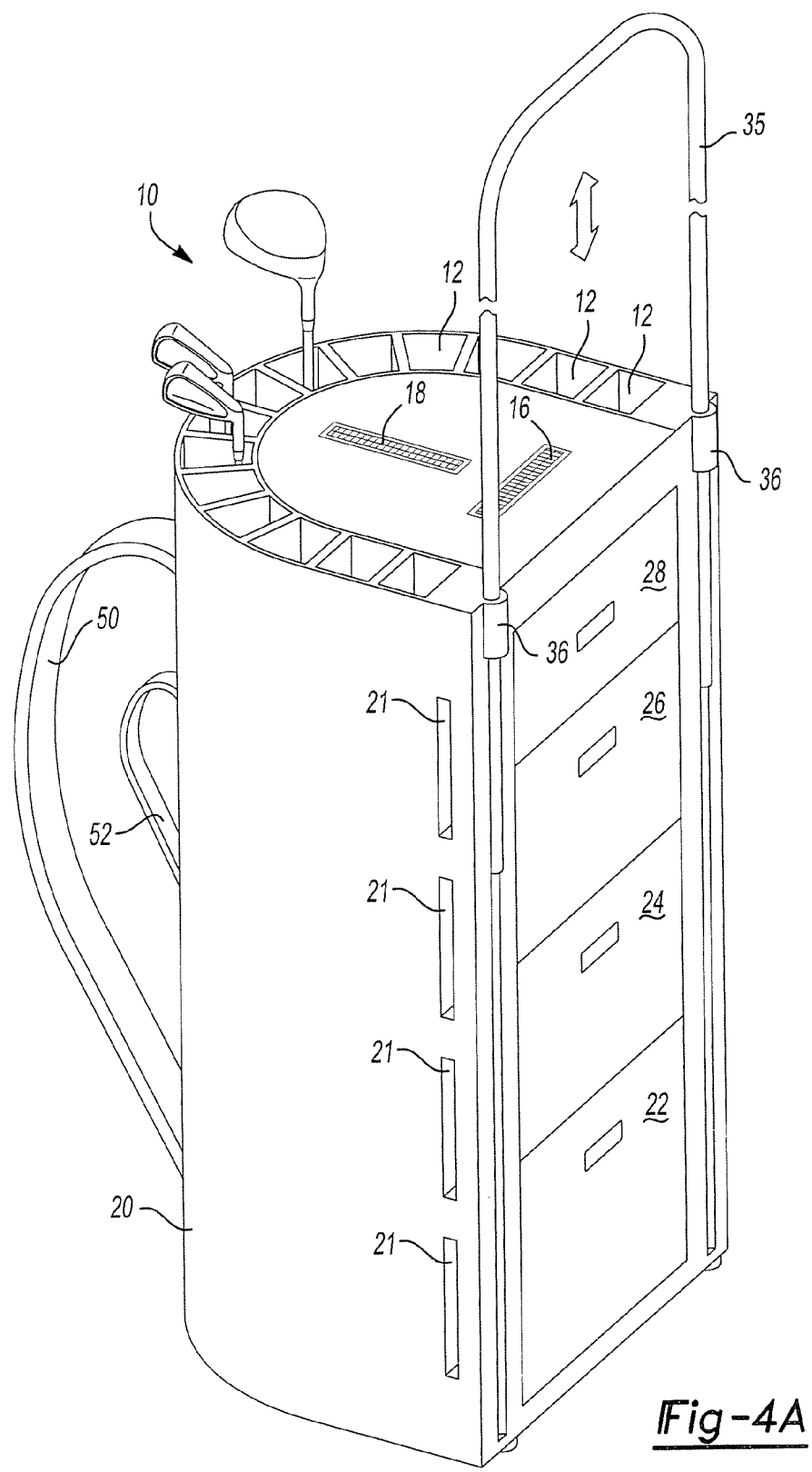
FIG. 4A is a is a perspective view of the embodiment shown in FIG. 4 wherein the pivotal stand legs are shown in the closed orientation.

Referring now to FIGS. 4 and 4A, a further embodiment of the golf bag 10 is shown. In this embodiment, the stand-to legs 30 are attached proximal the top of the golf bag by means of pivotal sleeves 36 and comprise a handle 35 interconnecting the two legs. The handle can be pivoted inward toward the center of the bag, which in turn pivots the legs 30 outward to rest the golf bag 10 unattended. Alternatively, the handle 35 can be extended upwards vertically to assist the user in pulling the golf bag on an attachable dolly or cart discussed subsequently herein. Both a shoulder strap 50 and a carrying strap 52 are optionally attached to the side of the golf bag to assist in maneuvering and transporting the bag 10.

Referring now to FIGS. 5A and 5B, a further advantage of the golf bag 10 is shown. In this embodiment, the golf bag comprises a plurality of vertically orientated grooves 21 positioned on the radial side of the golf bag on either side of, and proximal to, the planar side 13. These grooves are utilized for attaching the golf bag 10 to a dolly 50 for storage and transportation. The dolly 50 comprises a vertical back plate 58 attached to a perpendicular horizontal base plate 54 upon which the base of the golf bag 10 rests when attached. The back plate 58 and base plate 54 are attached to a U-shaped frame 52 having a pair of castors or wheels 55 rotationally attached near the bottom for rolling the dolly and golf bag 10. Positioned along the vertical edges of the back plate 58 are forward-extending side plates 56, each having a plurality of inward-projecting, deflectable tabs 51, which are complementary to, and received within, the grooves 21 of the golf bag when the golf bag is attached to the dolly. The back plate further protects the golf bag by concealing the storage compartments 22, 24, 26, and 28, protecting them from the elements as well as accidental opening during transportation. A complementary golf club cover 14 is also shown, having a circumferential rim 15 which frictionally holds the cover 14 to the top of the golf bag 10, also protecting the heads of the golf clubs from the elements as well as during transportation.

Figure 6A:
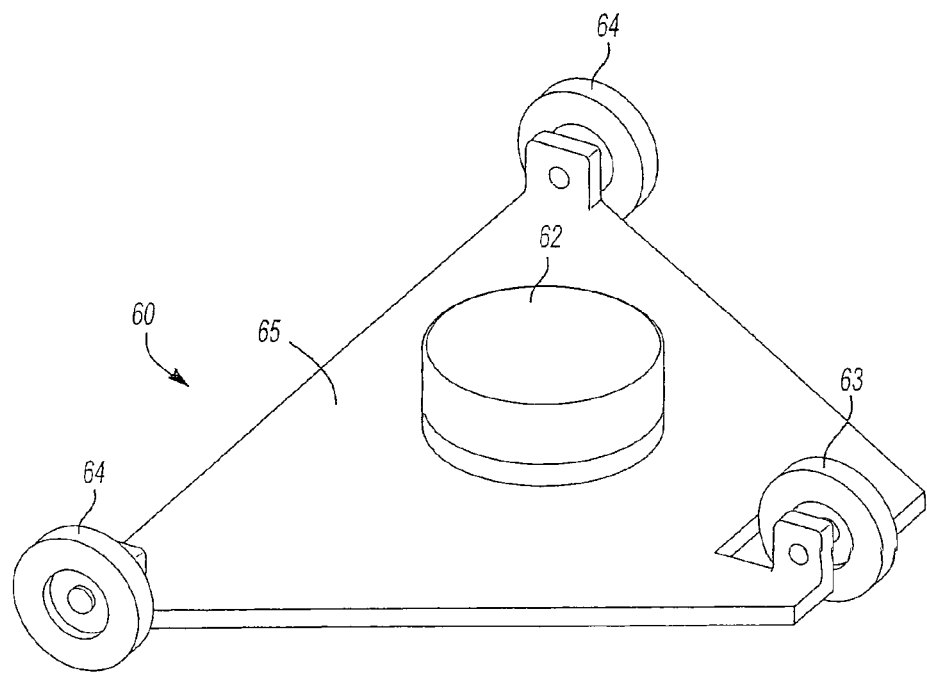
FIG. 6A is a perspective isolated view of a cart which may optionally be motorized to be used in conjunction with the golf bag of the present invention.
Figure 6B:
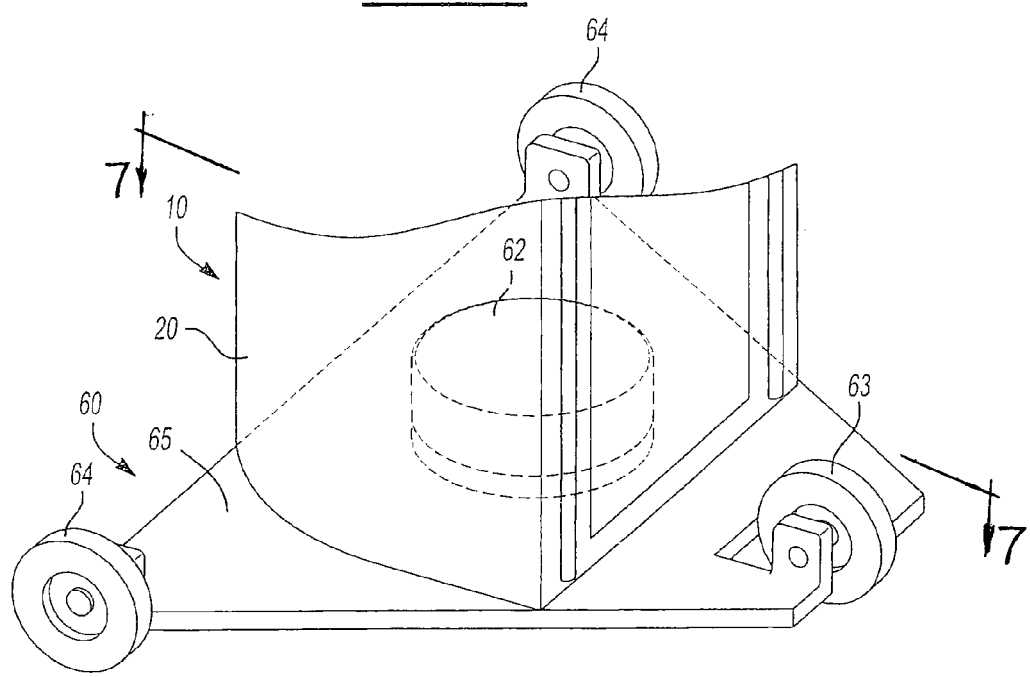
FIG. 6B is a partial, perspective view of the cart of FIG. 5A in combination with the golf bag.
Figure 7:
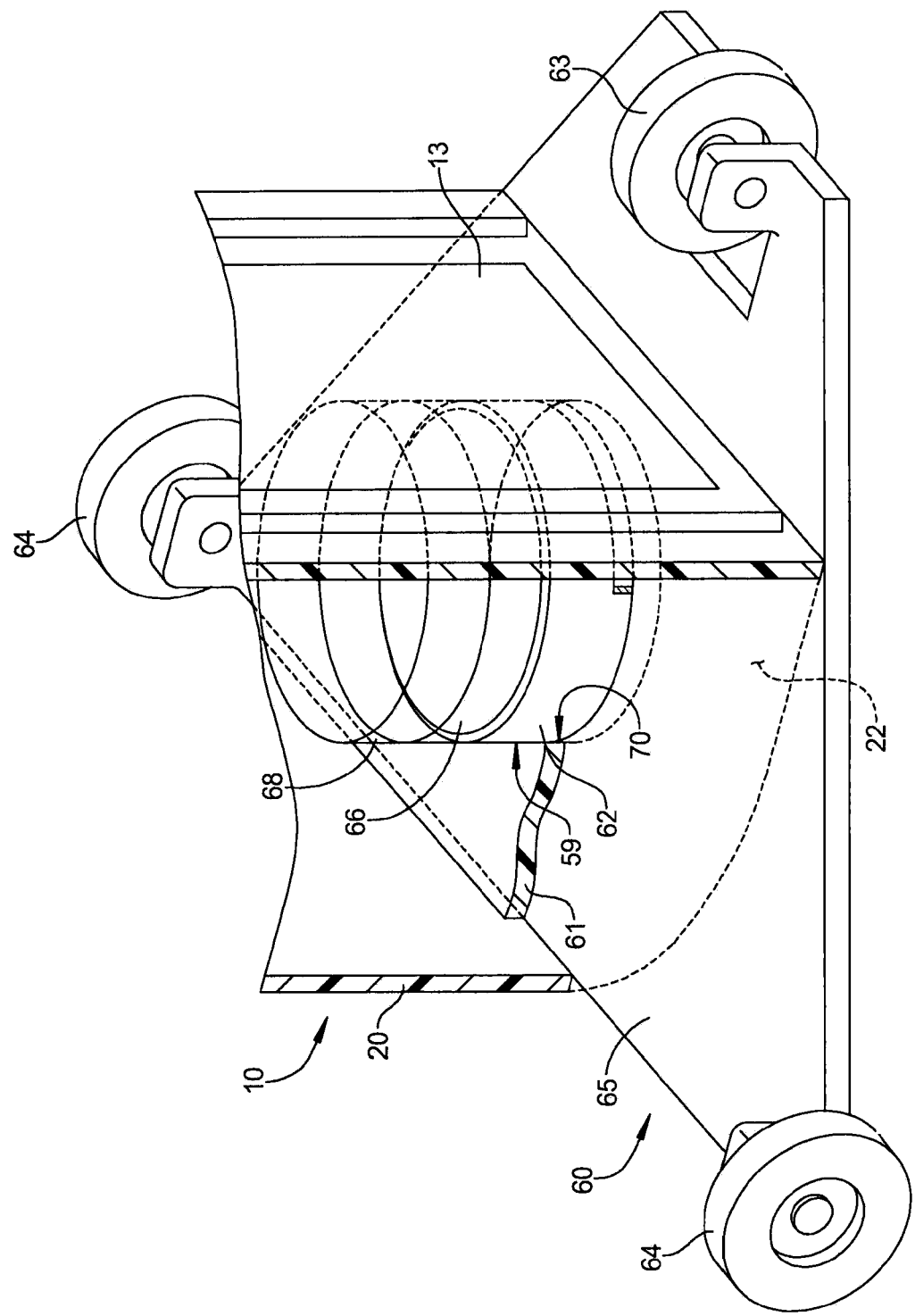
FIG. 7 is a cross sectional partial perspective view taken at section 7 of FIG. 6B.

Referring now to FIGS. 6A and 6B, an optional cart 60 is shown for use in combination with the golf bag 10. The cart 60 can be of any shape, but in this embodiment comprises a tri-wheeled design, having a single front wheel 63 and dual rear wheels 64 positioned at each of the rear corners.

The golf bag 10 comprises a recessed bottom portion 59 having a bottom side 61, complementary to a central raised portion 62 of the cart 60 which may contain an optional drive means 66 and/or battery 68 to power the cart. The raised portion 62 can be of any shape (herein shown as cylindrical) and is complementary to a similarly shaped recess 70 in the bottom side 61 of the golf bag within which it is securely received to attach the cart 60 to the golf bag 10. Compartment 22 is accessible from the planar front side 13 and the bottom side 61 of the semi-circular container.

If the cart is optionally powered, any number of control and/or operational systems known in the art may be implemented to control the drive mechanism, including remote controls or other suitable means.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A portable container for holding golf clubs and golf accessories, said container comprising:
    a semi-circular container, said container comprising a plurality of longitudinal compartments opening to a top side of said container for holding a plurality of golf clubs and a planar side;
    a plurality of vertically aligned storage compartments oriented generally flush with the planar side when in closed orientations;
    at least one second compartment positioned on said top side of said container, said at least one second compartment being accessible from the top side of said container;
    a recessed bottom portion of said container, said recessed bottom portion including a recess and one of said storage compartments, said recessed bottom portion and said one of said compartments each accessible from the planar side and a bottom side of said semi-circular container; and
    a cart having a plurality of wheels allowing the container to be maneuvered along the ground, and a central raised portion said central raised portion securely received within the recess in the bottom portion of the golf bag when the cart is attached to the bag.

2. The portable container of claim 1, wherein said semi-circular container further comprises at least one pair of foldable legs, said legs attached by pivotal attachment means attached to the planar side of said container to swing out from the golf bag at a bottom end, said foldable legs normally stored in a parallel, closed orientation in grooves created adjacent said planar side of said container.

3. The portable container of claim 1, wherein said central raised portion of said cart contains a powered drive means.

4. A portable container for holding golf clubs and golf accessories, said container comprising:
    a semi-circular container, said container comprising a plurality of longitudinal compartments opening to a top side of said container for holding a plurality of golf clubs and a planar front side;
    a recessed bottom portion of said container, said recessed bottom portion including a recess and a compartment accessible from each of the planar front side and a bottom side of said semi-circular container; and
    a cart having a plurality of wheels to allow the container to be maneuvered along the ground and a central raised portion, the central raised portion securely received within the recess in the bottom portion of the container to attach the cart to the container.

5. The portable container of claim 4, wherein said semi-circular container further comprises at least one pair of foldable legs, said legs attached by pivotal attachment means attached to the planar side of said container to swing out from the golf bag at a bottom end, said foldable legs normally stored in a parallel, closed orientation in grooves created adjacent said planar side of said container.

6. A portable container for holding golf clubs and golf accessories, said container comprising:
    a semi-circular container, said container comprising a plurality of longitudinal compartments accessible from a top side of said container for holding a plurality of golf clubs positioned around the periphery of a semi-circular portion of said semi-circular container;
    a plurality of storage compartments positioned within a planar side of said semi-circular container, accessible from the planar side of said container and positioned flush with the planar side in a closed orientation;
    at least one zippered storage compartment positioned on said top side of said container, said at least one zippered storage compartment being accessible from the top side of said container;
    a recessed bottom portion of said container, said recessed bottom portion including one of said plurality of storage compartments accessible from the planar side and a recess in a bottom side of said semi-circular container.

7. The portable container of claim 6, wherein said semi-circular container further comprises at least one pair of foldable legs, said legs attached by pivotal attachment means attached to the planar side of said container to swing out from the golf bag at a bottom end, said foldable legs normally stored in a parallel, closed orientation in grooves created adjacent said planar side of said container.

8. The portable container of claim 6, wherein said container further comprises a cart having a plurality of wheels for allowing the container to be maneuvered along the ground, said cart having a central raised portion detachably attaching to a complimentary shaped recess in the bottom side of said container to attach said container and said cart.

9. The portable container of claim 8, wherein said central raised portion of said cart contains a powered drive means.

* * * * *